United States Patent [19]

Nagano et al.

[11] 4,061,365
[45] Dec. 6, 1977

[54] SAFETY SYSTEM FOR PROTECTION OF AUTOMOTIVE SEAT OCCUPANT

[75] Inventors: Toshio Nagano, Tachikawa; Kazuo Kuramoto, Koganei, both of Japan

[73] Assignee: Nissan Motor Co., Ltd., Yokohama, Japan

[21] Appl. No.: 635,087

[22] Filed: Nov. 25, 1975

[30] Foreign Application Priority Data

Nov. 29, 1974 Japan .................. 49-137928
Nov. 29, 1974 Japan .................. 49-137929

[51] Int. Cl.² .................................. B60R 21/10
[52] U.S. Cl. .................. 280/745; 280/747; 280/751; 297/388; 297/389
[58] Field of Search .......... 280/745, 747, 744, 752; 180/82 C; 297/388, 389, 390

[56] References Cited

U.S. PATENT DOCUMENTS

| | | | |
|---|---|---|---|
| 3,770,078 | 11/1973 | Keppel | 280/745 X |
| 3,822,760 | 7/1974 | Lindblad | 280/745 X |
| 3,842,929 | 10/1974 | Wada | 280/745 X |
| 3,915,254 | 10/1975 | Nagano | 280/745 |
| 3,915,495 | 10/1975 | Oehm | 280/747 X |
| 3,929,203 | 12/1975 | Nagazumi | 180/82 C |

*Primary Examiner*—Joseph F. Peters, Jr.
*Assistant Examiner*—R. Schrecengost

[57] ABSTRACT

The system consists of a knee protector covered with a cushioning layer and arranged stationarily in front of and distant from a seat and a passive safety belt assembly having a single belt. The belt assembly includes a guide rail which is arranged upwardly of the door adjacent the seat to extend generally in the longitudinal direction of the car and a carrier member slidably engaged with the rail. The belt is coupled with the carrier member, and one end of the belt is supported by the floor and located close to the rear end of the inboard side of the seat. A drive mechanism having a reversible motor under the control of a circuit including door switches brings the carrier member to the front end of the rail when the door is opened so that the belt is slackened and unobstructive to ingress, but to the rear end of the rail when the door is closed so that the belt is passed diagonally around the upper half of the occupant's body.

10 Claims, 9 Drawing Figures

SAFETY SYSTEM FOR PROTECTION OF AUTOMOTIVE SEAT OCCUPANT

This invention relates to a safety system for protecting an occupant of an automotive seat including a passive occupant restraining belt and a stationarily arranged knee protector.

It is known to provide a passive occupant restraining belt assembly in which one or a plurality of safety belts are automatically brought into restraining positions from unrestraining and easy-to-enter positions by a sliding movement of a carrier which holds one end of each belt occurring in response to closure of a vehicle door and/or occupation of the seat. Such belt assemblies hitherto proposed involve a problem that the belt is arranged in rather a complicated manner and not only obstructs ingress of a seat occupant somewhat but also gives a feeling of anxiety or even fear to the occupant at the instant of the door being opened.

It is an object of the present invention to provide a safety system for protecting an occupant of an automotive seat, which system includes a passive and reliable safety belt but offers little obstruction to seating of the occupant either substantially or psychologically.

It is another object of the invention to provide a safety system for protecting an occupant of an automotive seat in regard to both the upper and lower halves of the occupant's body substantially without impairing rear visibility and a normally needful movability of the seated occupant.

The present invention is concerned with an automobile the body of which includes a seat supported on the floor, a door adjacent the outboard side of the seat, a first body member located forwardly of and distant from the seat, and a second body member located substantially upwardly of the door.

According to the invention, a safety system for protecting an occupant of the seat comprises a knee protector and a passive safety belt assembly. The knee protector comprises a frame member secured to the first body member and a cushioning member which is attached to and covers a surface of the frame member facing the front edge of the seat. The cushioning member is shaped and arranged such that the knees and legs of the occupant in the seat come into contact with the cushioning member when the lower half of the occupant's body moves forwards. The passive safety belt assembly comprises: (a) a guide rail secured to the second body member and located generally upwardly of the door, the front and rear ends of which guide rail are located forwardly of the front edge of the seat and rearwardly of the rear end of the seat, respectively, (b) a carrier member slidably engaged with the guide rail, (c) a safety belt coupled with the carrier member and supported at its one end on the floor at a location close to the rear end of the inboard side of the seat, the other end of which belt is held substantially on the axis of the guide rail, (d) a retractor which is connected to one end of the belt and is of a type capable of automatically retracting and locking the belt in a collision of the vehicle, (e) a drive mechanism for selectively bringing the carrier member to first and second positions which are respectively close to the front and rear ends of the guide rail, and (f) a control circuit for controlling the operation of the drive mechanism such that the carrier member is brought to the first position when the door is opened and to the second position when the door is closed. The first and second positions and the length of the belt are arranged such that the belt is slackened when the carrier member is in the first position and passed diagonally around the upper half of the seated occupant's body to extend from the waist of the occupant on the inboard side to the shoulder on the other side when the carrier member is in the second position.

The safety belt assembly preferably includes a buckle fixed to the carrier member and an anchor member which is connected to the upper end of the belt and detachably coupled with the buckle. In this case, the lower end of the belt is connected to the retractor, which is located close to the rear end of the inboard side of the seat and secured either to the floor or the inboard side of the seat.

Alternatively, the safety belt assembly may include a guide ring fixed to the carrier member. In this case, the belt is passed through this guide ring, and the upper end of the belt is secured to the vehicle body at a location rearward of the second position of the carrier member either by connecting to the retractor which is placed at this location or by coupling with a buckle placed at this location by the use of an anchor member fixed to the upper end of the belt. When the upper end of the belt is connected to the retractor, the lower end is secured to the floor by the use of the above combination of the buckle and the anchor member. When the upper end of the belt is coupled with the buckle, the lower end is connected to the retractor which is secured to either the floor or the inboard side of the seat.

The drive mechanism has preferably a reversible motor and a looped rope to pull the carrier member.

The control circuit for operating the motor includes relays, door switches and limit switches to detect the position of the carrier member.

Other features and advantages of the invention will become apparent from the following detailed description of preferred embodiments thereof with reference to the accompanying drawings, wherein:

Figures 1, 2:
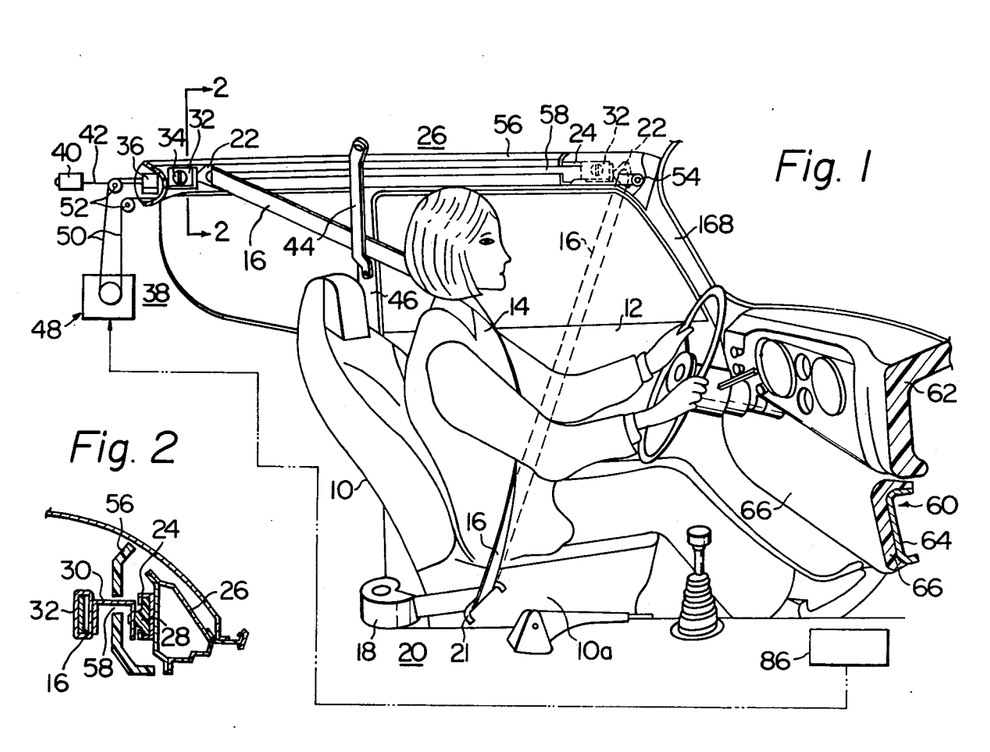
FIG. 1 is a perspective view of a portion of an automobile including a safety system according to the invention.
FIG. 2 is a sectional view taken along the line 2—2 in FIG. 1 and shows a portion of the safety belt assembly of the system.

Referring to FIGS. 1 and 2, a conventional seat 10 is supported on the floor of an automobile body (no numeral) in the usual manner and is accessible through a door opening which is opened and closed by a conventional door 12. A safety belt assembly according to the invention for a seat occupant 14 includes a safety belt 16 and a conventional retractor 18. The retractor 18 secures one end of the belt and is mounted on a rigid floor member such as a usual transmission tunnel 20 at a location rearward of and on the inboard side 10a of the seat 10. The retractor 18 has an automatic mechanism (not shown) which functions to retract and lock the belt 16 when the vehicle is subjected to an acceleration of above a certain level. The belt 16 extends generally forwards from the retractor 18 at first but is directed upwards and towards the door 12 by passing through an ear-like guide member 21 which is fixed obliquely to the inboard side 10a of the seat 10. When the occupant 14 takes the seated position, the belt 16 travels along the upper half of the occupant's body from the waist on the inboard side to the shoulder on the other side. The belt 16 extends farther and the extending end is connected to an anchor plate 22.

A guide rail 24 is secured to a body member located upwardly of the door 12 as typified by a roof side rail 26 and arranged to lie generally horizontally between a forward terminal near the front edge of the door 12 and a rear terminal somewhat rearwards of the seat 10. As shown in FIG. 2, a follower member 28 slidably engages with the guide rail 24, and a carrier member 30 is fixed to the follower 28. A buckle 32 is secured to the carrier member 30 and coupled with the anchor plate 22. The buckle 32 is constructed such that the anchor plate 22 can be detached therefrom by pushing a button 34 of the buckle 32. Adjacent the rear end of the guide rail 24, a latch mechanism 36 is secured to a body member, e.g., the roof side rail 26 or a rear pillar indicated at 38, so that the carrier member 30 engages with and is held stationarily by the latch mechanism 36 when the follower 28 brings the carrier 30 to this position. The carrier 30 can be released from the locked state when an external force is applied to the latch mechanism 36 by exciting a solenoid device 40 which is connected to the latch mechanism 36 either directly or via a pull wire 42.

An ear-like guide member 44 is arranged generally vertically to and across the guide rail 24 at a position approximately laterally of the back-rest of the seat 10. In the illustrated embodiment, the guide member 44 is fixed at the upper end thereof to the roof side rail 26 and at the lower end to a center pillar 46 of the vehicle body such that the guide member 44 is entirely spaced from the guide rail 24 and also from the pillar 46 except for contact due to fixing. The belt 16 passes through a gap between the guide member 44 and the center pillar 46 when the carrier 30 and the anchor plate 22 move rearwards. When the anchor plate 22 is positioned at the rear end of the guide rail 24, the guide member 44 holds an upper portion of the belt 16 relatively distant from the seat 10, so that the belt 16 does not pass around the neck of the occupant 14 but always passes around the shoulder.

To make slide the follower 28 along the guide rail 24, the carrier 30 is linked with a drive mechanism generally indicated at 48. The drive mechanism 48 includes a rope 50 which is passed around rear idler pulleys 52 and a front idler pulley 54 and connected to the carrier 30 as will be described hereinafter.

The guide rail 24, latch mechanism 36, solenoid device 40, and pulleys 52 and 54 are almost entirely hidden in a cover member 56, which is secured to the vehicle body and usually made of a well-looking synthetic resin. The cover 56 has a slit 58 formed parallel to the guide rail 24 not to disturb the movement of the carrier 30.

In addition to the thus arranged safety belt assembly, a safety system according to the invention has a knee protector 60 which is mounted on a vehicle body member, e.g., a dash panel (not shown) under an instrument panel 62 with respect to the front seat 10. In other words, the knee protector 60 is arranged in front of and at a certain distance from the front edge of the seat 10.

The knee protector 60 is made up of a frame 64 and a soft pad 66 which covers a surface of the frame 64 facing the seat 10. The soft pad 66 of the knee protector 60 has nearly the same width as the seat 10 and a height sufficient for preventing the knees and legs of the occupant 14 from colliding with the dash panel or dashing into a space e.g., under the instrument panel 62 during a collision of the vehicle.

Figure 3:
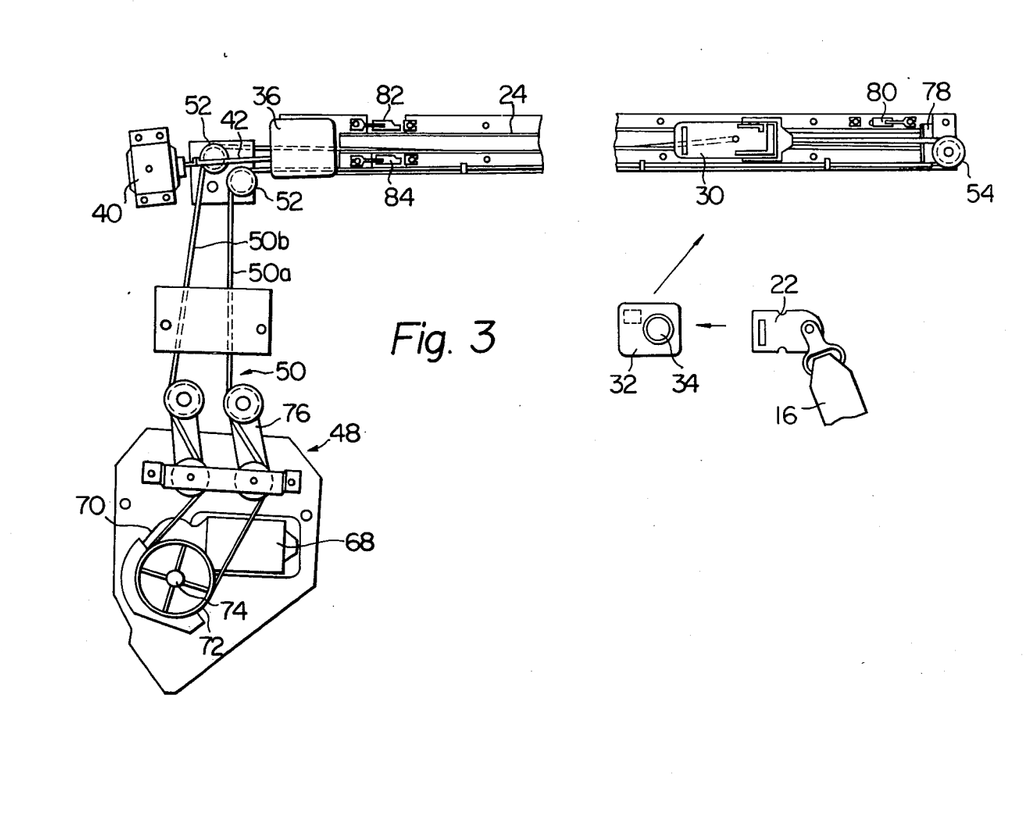
FIG. 3 is a side elevation of a portion of the system of FIG. 1 mainly for showing a drive mechanism of the system.

Referring to FIG. 3, the drive mechanism 48 includes a motor 68 which can revolve in either direction, a reduction gear assembly 70, a drive pulley 72 mounted on the output shaft 74 of the reduction gear assembly 70 and a mechanism 76 for adjusting the tension of the rope 50 optimumly. Both ends of the rope 50 are connected to the carrier 30, so that the rope 50 forms a loop or is arranged endlesswise. The looped rope 50 is passed at one end portion around the drive pulley 72 and at the other end portion around the front idler pulley 54 which is positioned adjacent and forwardly of the front end of the guide rail 24. No intersection occurs in the looped rope 50 because the two portions indicated at 50a and 50b are respectively passed around the two idler pulleys 52 which are positioned rearwards of the latch mechanism 36 at a distance from each other. A stopper 78 is provided at the front end of the guide rail 24. Thus, the carrier 30 moves reciprocatingly along the guide rail 24 as the reversible motor 68 makes revolutions in the positive and negative directions. A forward movement of the carrier 30 stops upon contact of the carrier 30 with the stopper 78 while a rearward movement stops when the carrier 30 engages with the latch mechanism 36.

The guide rail 24 is equipped with a first limit switch 80 at its front end portion and second and third limit switches 82 and 84 at a rear end portion. These limit switches 80, 82 and 84 are the elements of a control circuit generally indicated at 86 in FIG. 1 for controlling the operation of the motor 68. As will be described in detail hereinafter with respect to a preferred embodiment, the carrier 30 changes its position with respect to the guide rail 24 generally in the following manner. When the door 12 is opened, the motor 68 revolves in the positive direction and pulls the right and lower portion 50a of the rope 50. Accordingly, the follower 28 is pulled forwards together with the carrier 30. The motor 68 is caused to stop revolution when the carrier 30 comes into contact with the stopper 78. In this state, the belt 16 is in a state as shown in FIG. 1 by broken lines, so that the occupant 14 can get into the vehicle and sits in the seat 10 without meeting any obstruction by the presence of the belt. When the occupant 14 is seated and the door 12 is closed (and preferably when the ignition switch is turned on), the motor 68 begins to revolve in the negative direction, so that the left and upper portion 50b of the rope 50 pulls the carrier 30 rearwards. Accordingly, the follower 28 moves rearwards along the guide rail 24 together with the buckle 32 and the coupled anchor plate 22 until the carrier 30 engages with the latch mechanism 36. In this state, the belt 16 is in the restraining position as shown in FIG. 1 by the solid lines and passed diagonally around the upper half of the occupant's body. Thereafter the belt 16 remains in this position until the vehicle comes to rest and the door 12 is opened.

Figure 4:
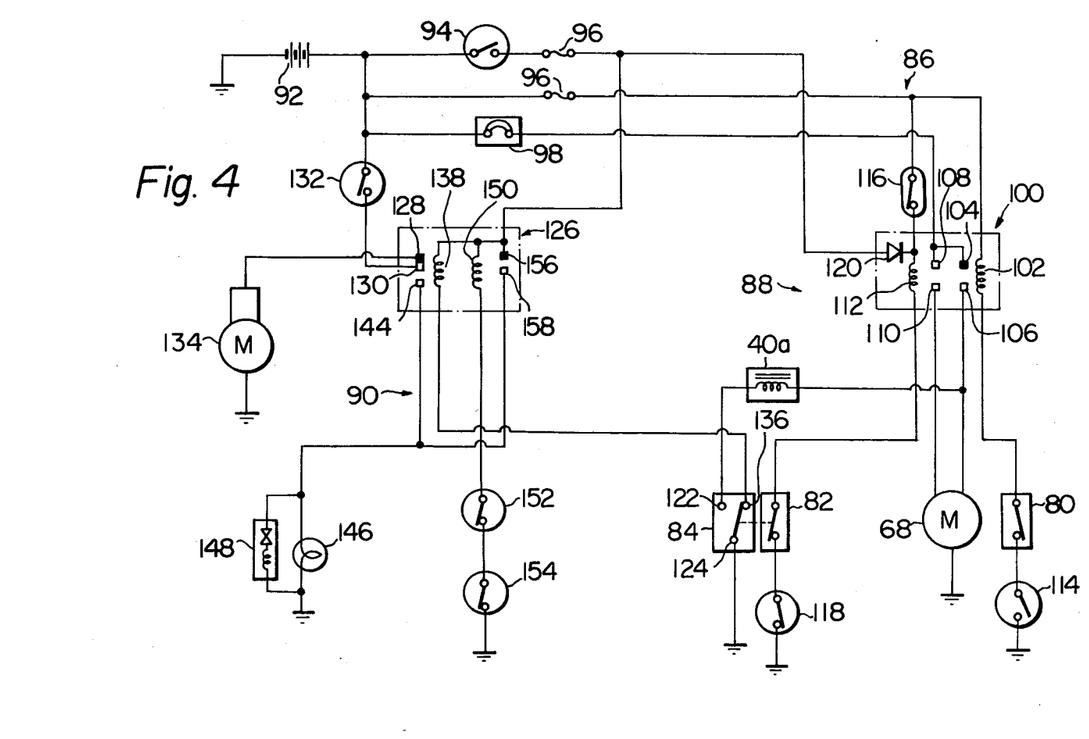
FIG. 4 is a circuit diagram of a control circuit for the drive mechanism of FIG. 3.

FIG. 4 is a circuit diagram of a preferred embodiment of the control circuit 86. The illustrated circuit can be divided roughly into two parts: one indicated at 88 is for the above summarized function of the motor 68, and the other indicated at 90 is for giving warning to the occupant 14 if the occupant 14 intends to drive the vehicle before the belt 16 is brought into the restraining position or detach the anchor plate 22 from the buckle 32 during driving.

The control circuit 88 receives power from a power source 92 on board the vehicle through the ignition switch 94, fuses 96 and a circuit breaker 98. A relay 100 is arranged to govern the operation of the motor 68. The motor 68 revolves in the positive direction, when a first solenoid coil 102 of the relay 100 is excited and contacts 104 and 106 are closed, but revolves in the negative direction when contacts 108 and 110 are closed by excitation of a second coil 112. The first coil 102 is connected in series with the limit switch 80, which is normally closed but opened when the carrier 30 is in contact with the stopper 78, and a door switch 114 which is normally open but closed when the door 12 is opened. The second coil 112 is connected in series with a seat switch 116, which is normally closed but opened when the occupant 14 is seated in the seat 10, the limit switch 82 which is normally closed but opened when the carrier 30 engages with the latch mechanism 36, and a second door switch 118 which is normally closed but opened when the door 12 is opened. The ignition switch 94 is connected with the second coil 112 through a diode 120 which is in parallel with the seat switch 116 so that the second coil can be excited when the switch 116 is in the off state. The coil 40a of the solenoid device 40 is connected to the contact 106 in parallel with the motor 68, but the excitation circuit is normally broken by the limit switch 84. Contacts 122 and 124 of this limit switch 84 are closed only when the adjacent limit switch 82 is in the off state.

The warning and interlock circuit 90 has an interlock relay 126, and contacts 128 and 130 of this relay 126 forms part of the power circuit between an engine starter switch 132 and a starter motor 134 on the vehicle. The limit switch 84 is of the changeover type, and one contact point 136 thereof, which is isolated from the control circuit 88, is connected to the ignition switch 94 through a first coil 138 of the relay 126 which governs the position of the contact 130. In the limit switch 84, the contacts 136 and 124 are closed when the limit switch 82 is in the on state. In the relay 126, the contacts 128 and 130 are closed only when the first coil 138 is unexcited. When the coil 138 is excited, the contact point 139 is isolated from the contact point 128 and instead brought into contact with another contact point 144. This contact point 144 is connected to a warning lamp 146 and/or a warning buzzer 148. The relay 126 has another coil 150 which is in series connection with the ignition switch 94, a selector switch 152 which is normally in the on state but opened when the transmission (not shown) of the vehicle is in the neutral position, and a belt switch 154 which is normally closed but opened when the anchor plate 22 is coupled with the buckle 32 and the carrier 30 is in engagement with the latch mechanism 36. This coil 150 governs contacts 156 and 158 which are normally open but provide, when they are closed, a circuit connecting the ignition switch 94 to the lamp 146 and/or buzzer 148.

The operation of the entire control circuit 86 in relation to the resulting operation of the drive mechanism 48 and the safety belt assembly will be explained below.

1. When the door 12 is opened from the outside, the door switch 114 is closed and the contacts 104 and 106 of the relay 100 are closed. Accordingly, the motor 68 is powered and revolves in the positive direction, and the carrier 30 is moved forwards by the rope 50 until it comes into contact with the stopper 78 and the limit switch 80. Then the limit switch 80 is opened and the motor 68 stops the revolution.

2. Since the belt 16 is now in the state as illustrated in FIG. 1 by the broken lines, the occupant 14 can easily get into the vehicle. When the occupant 14 sits in the seat 10 and turns the ignition switch 94 on after the door 12 is closed, the second coil 112 of the relay 100 is excited and closes the contacts 108 and 110. Consequently, the motor 68 begins to revolve in the negative direction and the carrier 30 is pulled rearwards until it engages with the latch mechanism 36 and comes into contact with the limit switches 82 and 84. Due to resulting opening of the limit switch 82, the motor 68 again comes to rest, and the belt 16 remains in the restraining position as shown in FIG. 1 by the solid lines. At the same time the belt switch 154 is opened.

3. In this state, the starter motor 134 is operable by turning the starter switch 132 on since the contacts 136 and 124 of the limit switch 84 are kept open and the coil 138 of the interlock relay is not excited. If, on the other hand, the starter switch 132 is closed before the carrier 30 is moved to and engages with the latch mechanism 36, the coil 138 is still excited and the contact point 130 is not in contact with the contact point 128 but in contact with the contact point 144. Accordingly, the starter motor 134 cannot be operated and the warning lamp 146 and/or the buzzer 148 give warning to the occupant 14.

4. If the anchor plate 22 is detached from the buckle 32 by pushing the button 34 when the ignition switch 94 is in the on state and the transmission is in a position other than the neutral position, the belt switch 154 is closed and the coil 150 of the interlock relay 126 is excited. As a result, the warning lamp 146 and/or the buzzer 148 give warning to the occupant 14.

5. When the occupant 14 opens the door 12 to get off the vehicle, the motor 68 revolves in the positive direction and causes the carrier 30 to be moved to the front end position in the same way as in the case of the door 12 being opened from the outside. Accordingly, the occupant 14 can leave the seat 10 without any trouble attributable to the presence of the belt 16.

6. When the door 12 is closed from the outside, the motor 68 revolves in the negative direction in the same way as in the case of the door 12 being closed by the seated occupant 14, so that the carrier 30 is returned to the rear end position and causes the motor 68 to stop by opening the limit switch 82.

Figures 5, 6:
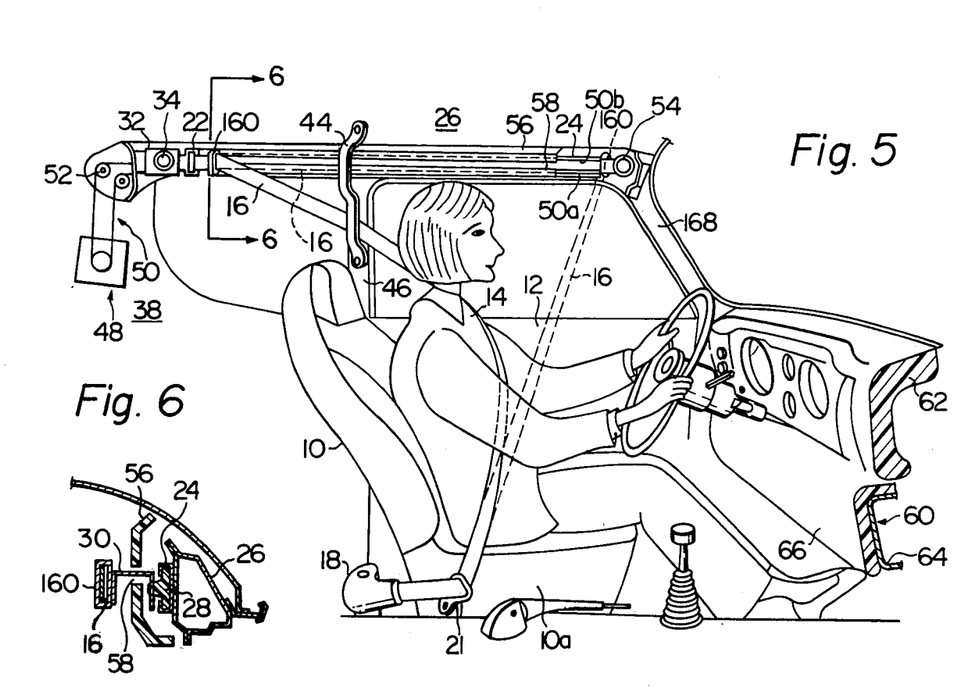
FIG. 5 is a perspective view generally similar to FIG. 1 but shows a modification of the safety belt assembly.
FIG. 6 is a sectional view taken along the line 6—6 in FIG. 5.
Figures 7, 9:
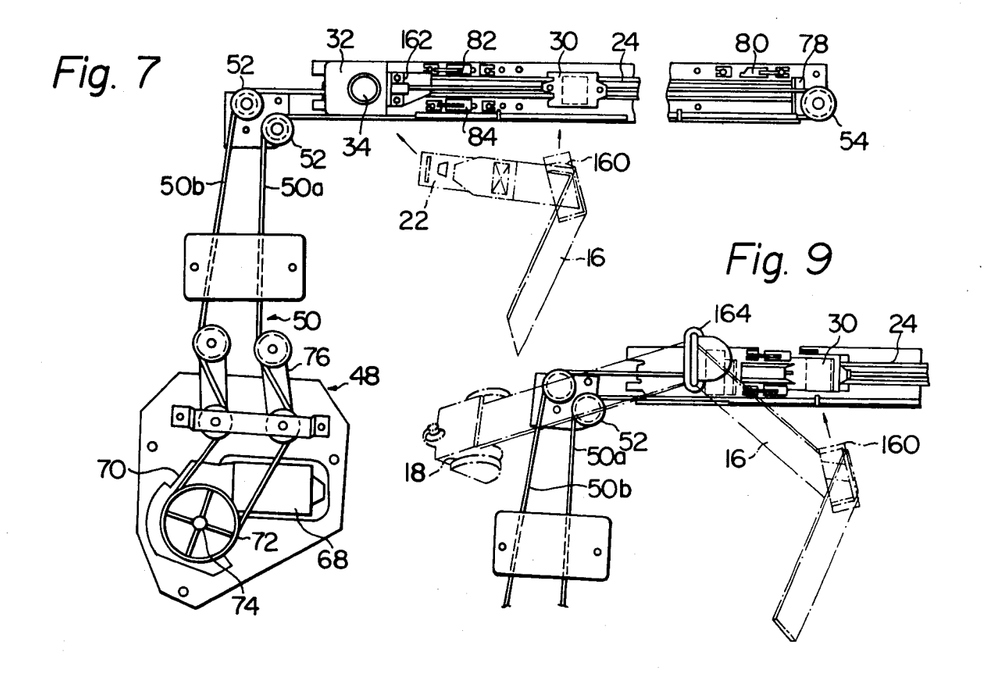
FIG. 7 is a side view generally similar to FIG. 3 with respect to the safety belt assembly of FIG. 5.
FIG. 9 is a side view generally similar to FIG. 3 with respect to the safety belt assembly of FIG. 8.

FIGS. 5-7 show a modification of the above described embodiment with respect to the coupling manner of the belt 16 with the carrier 30. In this embodiment, the buckle 32 is not fixed to the carrier 30 but fixed to the guide rail 24 at its rear end as seen in FIG. 7. The anchor plate 22 which is attached to the upper end of the belt 16 is detachably coupled with the buckle 32 in the same manner as in the previous embodiment. A guide ring 160 is secured to the carrier 30 as seen in FIG. 6, and the belt 16 passes slidably through the guide ring 160. The latch mechanism 36 of FIGS. 1 and 3 is omitted in this case, and instead a rearward stopper 162 is secured to the guide rail 24 at its rear end portion, so that the stopper 162 is positioned forwardly of and adjacent the stationary buckle 32. In other respects, the system of FIG. 5 is identical with the system of FIG. 1.

As the carrier 30 is moved along the guide rail 24 together with the guide ring 160, the belt 16 meets the guide rail 24 at different distances from the anchor plate 22. Also with the thus arranged belt 16, the occupant 14 can get in the vehicle and sits in the seat 10 with no obstruction by the belt 16 when the guide ring 160 is in contact with the front stopper 78, but can be satisfactorily restrained from being thrown out of the seat 10 when the guide ring 160 is in contact with the rear stopper 162. Although this embodiment will need the belt 16 and the guide rail 24 to be somewhat longer than those for the system of FIG. 1 and/or the belt 16 will be less slackened in the unrestraining position, the omission of the latch mechanism 36 is a practical advantage of the system of FIG. 5.

Figure 8:
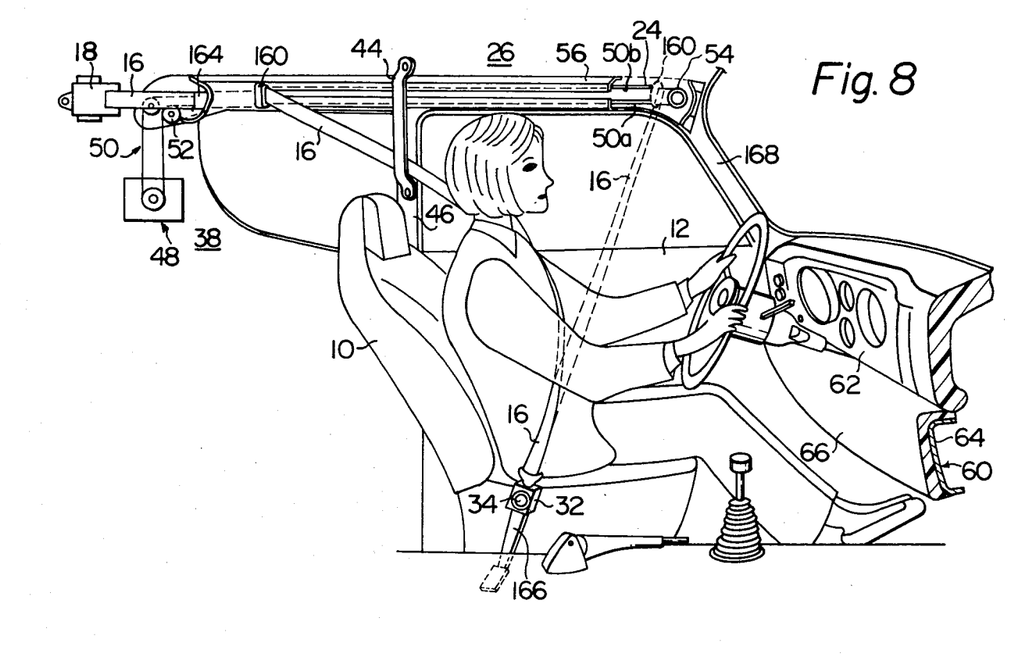
FIG. 8 is a perspective view generally similar to FIG. 5 but shows another modification of the safety belt assembly.

In FIGS. 8 and 9, the locations of the retractor 18 and the buckle 32 are exchanged from each other compared with the locations in FIG. 5. The retractor 18 is fixedly disposed, for example, in the rear pillar 38 with provision of a guide member or a through ring 164 secured to the rear end of the guide rail 24. The buckle 32 coupled with the anchor plate 22, is secured to a bracket 166 which is fixed to the floor and arranged adjacent the inboard side 10a of the seat 10. The state of the belt 16 is changeable in the same way as in the case of FIG. 5. Since the buckle 32 is positioned close to the seat 10, the occupant 14 can detach the anchor plate 22 from the buckle 32 when the occupant 14 intends to get out of the seat 10 in an emergency.

A safety system according to the invention has the following advantages.

1. In a collision of the vehicle, the upper half of the occupant's body is fully restrained from moving forwards by the diagonally extending belt 16 while the knees and legs are prevented from colliding with a rigid member by the knee protector 60. Besides, the provision of the knee protector 60 prevents the occupant 14 from lying down and diving under the instrument panel 62. The soft pad 66 of the knee protector 60 is effective in protecting the knees and legs against severe injuries. The frame 64 of the knee protector 60 can be made in a energy-absorbing construction, which affords an additional protection to the occupant 14.

2. The occupant 14 feels no anxiety or fear when he opens the door 12 to get in the vehicle since the system includes neither wrap belt nor usual shoulder belt but has only a greatly slackened and simple belt 16. Apart from such a psychological effect, the occupant 14 can get in the vehicle and sit in the seat 10 with no trouble by the presence of the belt 16.

3. The belt 16 in the restraining position is passed diagonally around the upper half of the occupant's body to extend from one side of the waist to the other side of the shoulder, so that the occupant 14 is allowed to move considerably freely in the seat 10. Accordingly, the wearing of the belt 16 does not cause any particular fatigue or inconvenience of the occupant 14, or disturb the rear visibility. The occupant 14 in the restrained state can operate or handle freely various articles attached to the door 12 or the instrument panel 62 such as an arm rest, an inboard lock knob for the door 12, a regulator handle for the window pane, a handle of a ventilation window, a glove compartment and a coin case.

4. Since the belt 16 is caught by the guide member 44, the belt 16 in the restraining position always passes around the shoulder of the occupant 14: the belt 16 does not come into contact with the neck of the occupant 14. Even in a collision of the vehicle, the belt 16 does not inflict injuries to the occupant 14 at his shoulder or neck.

5. Owing to the provision of the guide member 21 on the side portion of the seat 10, a major portion of the belt 16 takes a constant position in the restraining state even when the position of the seat 10 is changed either in the forward direction or in the rearward direction.

6. The combination of the guide rail 24 and the follower member 28 affords a smooth, reliable and rattle-free movement of the carrier 30.

7. The guide rail 24, carrier 30, rope 50, pulleys 52 and 54, and latch mechanism 36 can be hidden in the cover 56 which not only affords a good appearance but also minimizes intrusion of dust into the above elements. The drive mechanism 48 can be hidden, e.g., in the center pillar 46 of the vehicle body.

8. The belt 16 is brought to the restraining position after the occupant 14 sits in the seat 10 and closes the door 12, so that the presence of the belt 16 offers no obstruction to the occupant's action of closing the door 12. On the other hand, the occupant 14 is almost necessarily subjected to the restraint by the belt 16 since warnings are given and the engine cannot be started if the belt 16 is not in the proper restraining position.

9. Even if the drive mechanism 48 or the control circuit 86 is locally broken in a collision of the vehicle and the belt 16 does not return to the unrestraining position despite opening of the door 12, the belt 16 can be unfastened by pushing the button 34 and detaching the anchor plate 22 from the buckle 32.

10. Since the belt 16 is brought to the unrestraining position merely by opening the door 12, any person can get in and/or get out easily when loading or unloading of baggages or a shopping in a short time is intended.

The following variations are incorporated in the invention: (a) The retractor 18 may be secured to the frame of the seat 10 on the inboard side. Then the restraining position of the belt 16 can be kept constant irrespective of the position of the seat 10 without needing the provision of the guide member 21. (b) The motor 68, reduction gear assembly 70 and tension regulator 76 may be mounted on a side member of the vehicle body at locations beneath the instrument panel 62 accompanied by passing the rope 50 locally in the front pillar 168. This arrangement needs not to cut the rear pillar 38 for receiving therein the above elements. (c) In securing the guide rail 24 to the roof side rail 26, the roof side rail 26 may be cut somewhat so that the guide rail 24 may not protrude noticeably into the passenger compartment if the side rail 26 retains a sufficient rigidity when it is so cut as to accomplish the object.

What is claimed is:

1. In combination with an automobile the body of which includes a seat supported on a floor, a door adjacent the outboard side of the seat, a first body member located forwardly of and distant from the seat and a second body member located substantially upwardly of the door, a safety system for protecting an occupant of the seat, comprising:

a frame member secured to the first body member and a cushioning member attached to and covering a surface of said frame member facing the front edge of the seat, said cushioning member being shaped and arranged such that the knees and legs of the occupant in the seat come into contact with said cushioning member when the lower half of the occupant's body moves forwards; and a passive safety belt assembly comprising (a) a guide rail secured to the second body member and located generally upwardly of the door, the front and rear ends of said guide rail being located forwardly of the front edge of the seat and rearwardly of the rear end of the seat, respectively, (b) a carrier member slidably engaged with said guide rail, (c) a safety belt coupled with said carrier member and supported at a first end thereof on the floor at a location close to the rear end of the inboard side of the seat, a second end of said belt being held substantially on the axis of said guide rail, (d) a retractor stationarily arranged to hold one said second end of said belt, said retractor being of a type capable of automatically retracting and locking said belt in a collision of the automobile, a buckle fixed to said carrier member and an anchor member connected to said end of said belt and detachably coupled with said buckle said retractor being located close to the rear end of the inboard side of the seat and connected to said first end of said belt, (e) drive means for selectively bringing said carrier member to first and second positions respectively close to said front and rear ends of said guide rail, and (f) control means for controlling the operation of said drive means such that said carrier member is brought to said first position when the door is opened and to said second position when the door is closed, said first and second positions and the length of said belt being arranged such that said belt is slackened when said carrier member is in said first position and passed diagonally around the upper half of the seated occupant's body to extend from the waist of the occupant on the inboard side to the shoulder on the other side when said carrier member is in said second position, wherein said drive means comprises a reversible motor, a drive pulley, an idler pulley located forwardly of said first position, and a rope tensioned and passed around said drive pulley to extend therefrom towards said guide rail, one end of said rope being connected to said carrier member, the other end of said rope being connected to said carrier member after being passed around said drive pulley and said idler pulley, and wherein said control means comprise a first power circuit having first contacts to revolve said motor in the positive direction when said first contacts were closed, a second power circuit having second contacts to revolve said motor in the negative direction when said second contacts are closed, a first control circuit having in series with one another a first solenoid coil causing said first contacts to close when excited, a first door switch closing only when the door is open and a first limit switch opening only when said carrier member is in said first position, a second control circuit having in series with one another a second solenoid coil causing said second contacts to close when excited, a second door switch opening only when the door is open and a second limit switch opening only when said carrier member is in said second position.

2. A safety system as claimed in claim 1, wherein said retractor is secured to the inboard side of the seat.

3. A safety system as claimed in claim 1, wherein said retractor is secured to the floor, said safety belt assembly further comprising a guide member fixed to the inboard side of the seat at a location close to the rear end thereof in such an arrangement that said belt passes around said guide member at a distance from said retractor and extends therefrom in a varied direction towards said carrier member.

4. A safety device as claimed in claim 3, wherein said safety belt assembly further comprises another guide member fixed to the vehicle body at a location close to the upper and rear end of the outboard side of the seat, said another guide member extending generally vertically across and spaced from said guide rail, said belt passing around the outboard side of said another guide member, so that said belt comes into no contact with the neck of the occupant in the seat when said carrier member is in said second position.

5. A safety system as claimed in claim 4, wherein said safety belt assembly further comprises a latch device located rearwardly of said second position and an electromagnetically actuatable release device mechanically connected to said latch device, said carrier member being so constructed as to be caught by said latch device when brought to said second position.

6. A safety system as claimed in claim 1, wherein said control means further comprise an interlock circuit having a third solenoid coil connected to the engine starter switch, a third limit switch in series connection with said third solenoid coil opening only when said carrier member is in said second position, a changeover switch governed by said third solenoid coil, and a warning device, said changeover switch being in a first state connecting the engine starter switch to the engine starter motor when said third solenoid coil is unexcited and in a second state disconnecting the starter switch from the starter motor but connecting the starter switch to said warning device when said third solenoid coil is excited.

7. A safety system as claimed in claim 6, wherein said safety belt assembly further comprises a buckle fixed to said carrier member and an anchor member connected to said second end of said belt and detachably coupled with said buckle, said retractor being located close to the rear end of the inboard side of the seat and connected to said first end of said belt, and wherein said control means further comprise a warning circuit having a fourth solenoid coil connected to the engine starter switch, a transmission switch opening only when the transmission is in the neutral position, a belt switch opening only when said anchor member is coupled with said buckle, both of said transmission switch and said belt switch being in series with said fourth solenoid coil, and third contacts to connect said warning device to the starter switch, said third contacts being closed only when said fourth solenoid coil is excited.

8. A safety system as claimed in claim 1, wherein said retractor is secured to the floor, said safety belt assembly further comprising a guide member fixed to the inboard side of the seat at a location close to the rear end thereof in such an arrangement that said belt passes around said guide member at a distance from said retractor and extends therefrom in a varied direction towards said carrier member.

9. A safety system as claimed in claim 1, wherein said retractor is secured to the inboard side of the seat.

10. In combination with an automobile the body of which includes a seat supported on a floor, a door adjacent the outboard side of the seat, a first body member located forwardly of and distant from the seat and a second body member located substantially upwardly of the door, a safety system for protecting an occupant of the seat, comprising:

a frame member secured to the first body member and a cushioning member attached to and covering a surface of said frame member facing the front edge of the seat, said cushioning member being shaped and arranged such that the knees and legs of the occupant in the seat come into contact with said cushioning member when the lower half of the occupant's body moves forwards;

a passive safety belt assembly comprising (a) a guide rail secured to the second body member and located generally upwardly of the door, the front and rear ends of said guide rail being located forwardly of the front edge of the seat at a first position and rearwardly of the rear end of the seat at a second position, respectively, (b) a carrier member slidably engaged with said guide rail, (c) a safety belt coupled with said carrier member and supported at a first end thereof on the floor at a location close to the rear end of the inboard side of the seat, a second end of said belt being held substantially on the axis of said guide rail, (d) a retractor stationarily arranged to hold said first end of said belt, said retractor being of a type capable of automatically retracting and locking said belt in a collision of the automobile, a guide ring fixed to said carrier member, said belt being passed through said guide ring, said second end of said belt being secured to the vehicle body at a location rearward of said second position and a buckle secured to the vehicle body at a location rearward of said second position and an anchor member connected to said second end of said belt and detachably coupled with said buckle, (e) drive means for selectively bringing said carrier member to first and second positions respectively close to said front and rear ends of said guide rail, and (f) control means for controlling the operation of said drive means such that said carrier member is brought to said first position when the door is opened and to said second position when the door is closed, said first and second positions and the length of said belt being arranged such that said belt is slackened when said carrier member is in said first position and passed diagonally around the upper half of the seated occupant's body to extend from the waist of the occupant on the inboard side to the shoulder on the other side when said carrier member is in said second position, wherein said drive means comprises a reversible motor, a drive pulley, an idler pulley located forwardly of said first position, and a rope tensioned and passed around said drive pulley to extend therein towards said guide rail, one end of said rope being connected to said carrier member, the other end of said rope being connected to said carrier member after being passed around said drive pulley and said idler pulley, and wherein said control means comprise a first power circuit having first contacts to revolve said motor in the positive direction when said first contacts are closed, a second power circuit having second contacts to revolve said motor in the negative direction when said second contacts are closed, a first control circuit having in series with one another a first solenoid coil causing said first contacts to close when excited, a first door switch closing only when the door is open and a first limit switch opening only when said carrier member is in said first position, a second control circuit having in series with one another a second solenoid coil causing said second contacts to close when excited, a second door switch opening only when the door is open and a second limit switch opening only when said carrier member is in said second position.

* * * * *